(12) United States Patent
Takezoe (10) Patent No.: US 10,280,881 B2
(45) Date of Patent: May 7, 2019

(54) AIR QUANTITY CALCULATION DEVICE FOR INTERNAL COMBUSTION ENGINE

(71) Applicant: DENSO CORPORATION, Kariya, Aichi-pref. (JP)

(72) Inventor: Hiroyuki Takezoe, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 15/312,064

(22) PCT Filed: May 25, 2015

(86) PCT No.: PCT/JP2015/002618
§ 371 (c)(1),
(2) Date: Nov. 17, 2016

(87) PCT Pub. No.: WO2015/182107
PCT Pub. Date: Dec. 3, 2015

(65) Prior Publication Data
US 2017/0082075 A1 Mar. 23, 2017

(30) Foreign Application Priority Data
May 29, 2014 (JP) ................................. 2014-111309

(51) Int. Cl.
*F02D 41/00* (2006.01)
*F02M 35/10* (2006.01)
(Continued)

(52) U.S. Cl.
CPC ..... *F02M 35/10386* (2013.01); *F02D 41/003* (2013.01); *F02D 41/0047* (2013.01); *F02D 41/18* (2013.01); *F02D 41/248* (2013.01); *F02D 41/2464* (2013.01); *F02D 41/2474* (2013.01); *F02M 35/1038* (2013.01); *F02M 35/10373* (2013.01); *F02D 2041/001* (2013.01); *F02D 2200/0402* (2013.01); *F02D 2200/0406* (2013.01); *Y02T 10/47* (2013.01)

(58) Field of Classification Search
CPC ............ F02M 35/10386; F02D 41/003; F02D 41/0047; F02D 41/18; F02D 41/2464; F02D 41/2474; F02D 41/248
See application file for complete search history.

(56) References Cited

U.S. PATENT DOCUMENTS

2006/0037596 A1 2/2006 Fuwa
2012/0024258 A1\* 2/2012 Hokuto ............... F02D 41/0057
 123/299
2013/0008542 A1\* 1/2013 Irwin .................... F16K 31/402
 137/859

FOREIGN PATENT DOCUMENTS

JP 2005-337186 12/2005
JP 2012-026318 2/2012

\* cited by examiner

*Primary Examiner* — Matthew G Marini
(74) *Attorney, Agent, or Firm* — Nixon & Vanderhye P.C.

(57) ABSTRACT

An ECU calculates a cylinder flowing air amount based on an intake tube pressure, using an air intake valve model simulating a behavior of air flowing into a combustion chamber via an air intake valve. The ECU calculates an air intake amount based on a detection result of an air amount detection sensor, and determines whether the air intake amount matches an actual amount of air flowing into the combustion chamber. When the air intake amount is determined to match the actual amount, the ECU calculates a learnt value based on comparison of the cylinder flowing air amount with the air intake amount.

4 Claims, 4 Drawing Sheets

(51) Int. Cl.
*F02D 41/18* (2006.01)
*F02D 41/24* (2006.01)

AIR QUANTITY CALCULATION DEVICE FOR INTERNAL COMBUSTION ENGINE

CROSS REFERENCE TO RELATED APPLICATION

This application is the U.S. national phase of International Application No. PCT/JP2015/002618 filed on May 25, 2015, which designated the U.S. and claims priority to Japanese Patent Application No. 2014-111309 filed on May 29, 2014, the entire contents of each of which are hereby incorporated by reference.

TECHNICAL FIELD

The present disclosure relates to an air quantity calculation device for an internal combustion engine.

BACKGROUND ART

Various methods of calculating the amount of air flowing into a cylinder in an internal combustion engine have been proposed, and according to a known method among them, using an air intake valve model, a cylinder flowing air amount is calculated based on the pressure of an intake pipe (Refer to, for example, Patent Literature 1). According to the calculation method using the air intake valve model, the cylinder flowing air amount when the air intake valve is opened, is calculated in consideration of volumetric efficiency $\eta v$ of the internal combustion engine.

PRIOR ART LITERATURES

Patent Literature

Patent Literature 1: JP2012-26318A

SUMMARY OF INVENTION

In the internal combustion engine, characteristic deviation occurs due to manufacturing tolerances and durability decline and thus, the air intake valve model is learnt. In this case, a learnt value is calculated as an air amount correction value, based on comparison of an air intake amount calculated from a detection result of an air flow meter provided in an intake pipe with a cylinder flowing air amount calculated using the air intake valve model.

However, in consideration of the fact that the operating state varies in the internal combustion engine, in learning the amount of air, the air intake amount based on the detection value of the air flow meter cannot be regarded as an actual amount of air. That is, when air flows at a location downstream of the air flow meter, the air intake amount based on the detection value of the air flow meter and the cylinder flowing air amount based on the air intake valve model do not form a pair, such that the learning accuracy cannot be ensured. The learning accuracy lowers, degrading the calculation accuracy of the amount of air.

An object of the present disclosure is to provide an air quantity calculation device for an internal combustion engine capable of properly performing learning on the air intake valve model to improve the calculation accuracy of the amount of air.

According to an aspect of the present disclosure, the air quantity calculation device applied to an internal combustion engine calculates an cylinder flowing air amount that is an amount of air flowing into the combustion chamber, based on an intake tube pressure that is a pressure in the intake pipe, using an air intake valve model simulating a behavior of air flowing into a combustion chamber via an air intake valve. The air quantity calculation device includes an air flowing amount calculation unit that calculates an air intake amount flowing in the intake pipe, based on a detection result of an air amount detection sensor provided at the intake pipe, a determination unit that determines whether the air intake amount calculated by the air flowing amount calculation unit matches an actual amount of air flowing into the combustion chamber, and a learning unit that, when the air intake amount is determined to match the actual amount of air flowing into the combustion chamber, calculates a learnt value used to correct at least one of the cylinder flowing air amount or a characteristic value of the air intake valve model, based on comparison of the cylinder flowing air amount calculated using the air intake valve model with the air intake amount calculated by the air flowing amount calculation unit.

The amount of air can be learnt by comparing the air intake amount calculated from the detection result of the air amount detection sensor with a cylinder flowing air amount calculated using the air intake valve model. In this case, even when a valve lift amount of the air intake valve deviates due to manufacturing tolerances or durability decline, error of the amount of air, which corresponds to the deviation, can be suppressed. In the above configuration, it is determined whether the air intake amount calculated based on the detection result of the air amount detection sensor matches the actual amount of air flowing into the combustion chamber. When the air intake amount and the actual amount of air flowing into the combustion chamber match each other, learning is made based on comparison of the air intake amount that is a detection value with the cylinder flowing air amount that is a model calculation value. For this reason, it prevents the matter that air flows downstream of the detection location of the air amount detection sensor, degrading the learning accuracy. This can properly achieve learning on the air intake valve model to improve the calculation accuracy of the amount of air.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
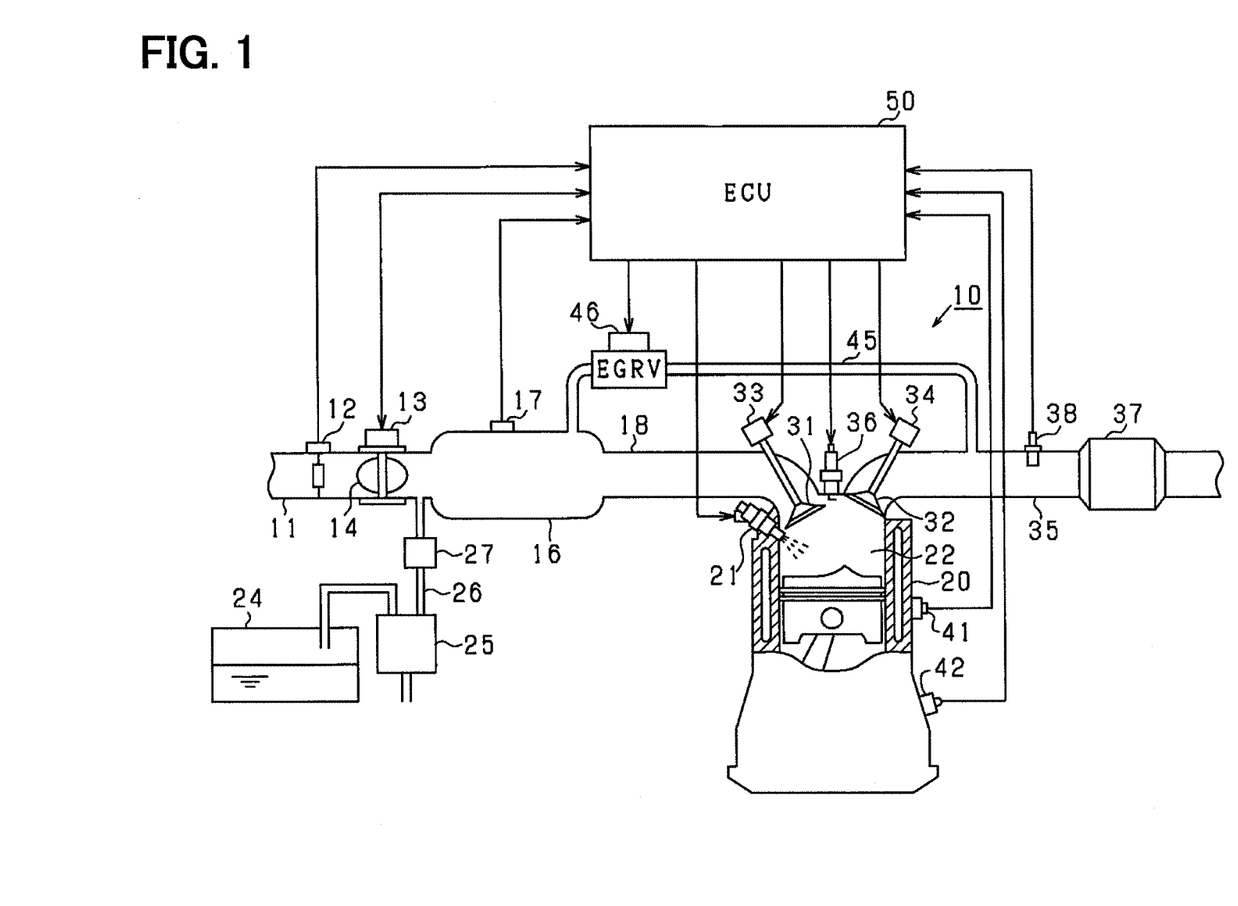
FIG. 1 is a schematic view illustrating an engine control system according to an embodiment of the present disclosure.

An embodiment of the present disclosure will be described below with reference to the drawings. In the present embodiment, various actuators in an internal combustion engine that is a multi-cylinder four-cycle gasoline engine mounted in a vehicle are to be electronically controlled. First, an overall schematic configuration of an engine control system will be described with reference to FIG. 1. FIG. 1 illustrates a direct-injection engine. However, an injection mode of the engine is not limited, and the engine may be a port-injection engine.

In an engine 10 illustrated in FIG. 1, an air flow meter 12 that detects the air intake amount is provided upstream of an intake pipe 11. A throttle valve 14, opening of which is adjusted by a throttle actuator 13 such as a DC motor, is provided downstream of the air flow meter 12, and a throttle opening sensor built in the throttle actuator 13 detects the opening of the throttle valve 14. In the present embodiment, the opening of the throttle valve 14 is referred to as throttle opening. A surge tank 16 is provided downstream of the throttle valve 14, and the surge tank 16 is equipped with an intake tube pressure sensor 17 that detects a pressure of the intake pipe. The surge tank 16 is connected with an intake manifold 18 that introduces air into each cylinder of the engine 10.

An injector 21 that is electromagnetically driven is provided at a cylinder block 20, and the injector 21 directly injects fuel into a combustion chamber 22. High-pressure fuel is supplied to the injector 21 via a high-pressure pump and a fuel pipe, which are not illustrated. In the present embodiment, the fuel pipe is a delivery pipe. The high-pressure pump increases the fuel pressure to, for example, about 10 to 20 MPa.

An evaporated fuel processor that discharges evaporated fuel generated in a fuel tank 24 to an intake passage is provided downstream of the throttle valve 14 in the intake pipe 11. The evaporated fuel processor includes a canister 25 filled with an adsorbent such as activated carbon, a purge pipe 26 that connects the canister 25 to the intake pipe 11, and a purge control valve 27 provided in the middle of the purge pipe 26. In the state where the canister 25 adsorbs evaporated fuel, when the purge control valve 27 is opened, evaporated fuel is discharged into the intake pipe 11.

An intake port and an exhaust port of the engine 10 are provided with an air intake valve 31 and an exhaust valve 32, respectively, which open and close according to rotation of respective cam shafts not illustrated. Opening the air intake valve 31 introduces intake air into the combustion chamber 22, and closing the exhaust valve 32 discharges combusted exhaust gas to an exhaust pipe 35. The air intake valve 31 and the exhaust valve 32 are provided with variable valve devices 33, 34, respectively, which vary an opening/closing timing of the respective valves. In the present embodiment, the opening/closing timing is also referred to as valve timing. The variable valve devices 33, 34 adjust relative rotational phase of a crank shaft of the engine 10 with respect to the intake and exhaust cam shafts, enabling phase adjustment to advanced side and retarded side with respect to a predetermined reference position. The variable valve devices 33, 34 each are hydraulic or electric variable valve mechanism.

A spark plug 36 is attached to a cylinder head of each cylinder of the engine 10, and a high voltage is applied to each spark plug 36 via a spark coil at desired ignition timing. The application of high voltage generates spark discharge between opposing electrodes of the spark plugs 36, igniting fuel in the combustion chamber 22 for combustion.

The exhaust pipe 35 is provided with a catalyst 37 that is an exhaust gas cleaning unit that cleans exhaust gas. The catalyst 37 is, for example, a three-way catalyst. An air-fuel ratio sensor 38 is provided upstream of the catalyst 37 in the exhaust pipe 35. A cooling water temperature sensor 41 that detects temperature of cooling water and a crank angle sensor 42 that outputs a rectangular crank angle signal at every predetermined crank angle of the engine 10 are attached to the cylinder block 20. In the present embodiment, the predetermined crank angle is, for example, in a period of 30° CA.

The surge tank 16 is connected to the exhaust pipe 35 via an EGR pipe 45, and an EGR valve 46 that is electromagnetically driven is provided in the middle of the EGR pipe 45. In the present embodiment, the EGR pipe 45 and the EGR valve 46 correspond to an EGR unit. An exhaust-side connection site of the EGR pipe 45 may be downstream of the catalyst 37. The amount of EGR gas that is the amount of exhaust gas recirculated from the exhaust pipe 35 to the intake passage is controlled by controlling the EGR opening that is the opening of the EGR valve 46.

Outputs of the above-mentioned various sensors are inputted to an electronic control unit (ECU) 50 responsible for engine control. The ECU 50 is mainly configured of a microcomputer including CPU, ROM, and RAM, and executes various control programs stored in the ROM, thereby controlling fuel injection amount and fuel ignition timing of the injector 21 according to an engine operating state, and ignition timing of the spark plug 36, as well as driving the variable valve devices 33, 34 on the intake and exhaust sides to appropriately control the opening/closing timing of the air intake valve 31 and the exhaust valve 32. Further, the ECU 50 opens the purge control valve 27 to appropriately discharge fuel absorbed in the canister 25 into the intake pipe 11, and opens the EGR valve 46 to perform EGR.

Figure 2:
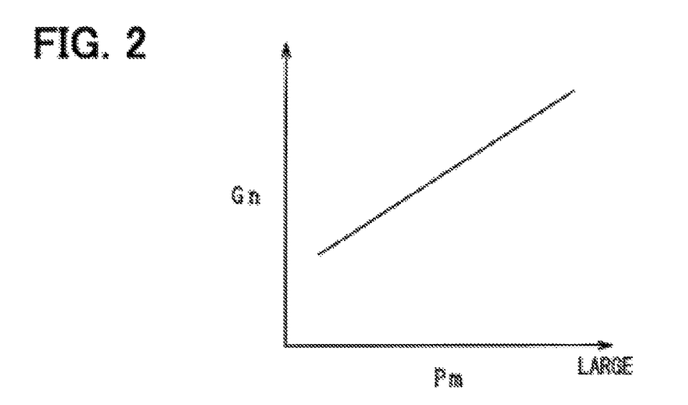
FIG. 2 is a view illustrating a relation between intake tube pressure and a cylinder flowing air amount.

In the present embodiment, using an air intake valve model simulating a behavior of air flowing into the combustion chamber 22 via the air intake valve 31, a cylinder flowing air amount Gn that is the amount of air flowing into the combustion chamber 22 is calculated based on an intake tube pressure Pm. The cylinder flowing air amount Gn is used to control fuel injected amount and torque. The air intake valve model is made in consideration of volumetric efficiency ηv of the engine 10, and the cylinder flowing air amount Gn is calculated based on correlation as illustrated in FIG. 2. Using intake temperature, engine rotational speed, opening/closing timing of the air intake valve 31 as parameters, the cylinder flowing air amount Gn may be calculated.

In the air intake valve 31, a valve lift amount is deviated due to manufacturing tolerances and durability decline. In the present embodiment, durability decline is, for example, wear of a cam ridge, adhesion of deposits. For example, when the valve lift amount of the air intake valve 31 is deviated to be small, the actual amount of air flowing into the combustion chamber decreases according to the deviation. For this reason, in the air intake valve model, a calculation error of the cylinder flowing air amount Gn can occur. In the present embodiment, to suppress the calculation error of the cylinder flowing air amount Gn, the air intake valve model is learnt. Specifically, the air amount correction value that corrects a deviation of the amount of flowing air due to manufacturing tolerances and durability decline of the air intake valve 31 is obtained by learning processing, and the cylinder flowing air amount Gn that is an output of the air intake valve model is corrected using the air amount correction value.

Since the amount of air flowing into the combustion chamber 22 corresponds to a pressure difference between the intake manifold 18 and the combustion chamber 22, and intake resistance, characteristics of deviation of the amount of flowing air are determined depending on the deviation direction in which the valve lift amount decreases or increases, and the amount of deviation. However, in the case where the deviation of the valve lift amount occurs, for a specific parameter of various parameters indicating the engine operating state, the deviation direction of the amount of flowing air becomes uniform irrespective of the value of the parameter, while for other parameters other than the specific parameter, the deviation direction of the amount of flowing air does not become uniform.

Figure 3:
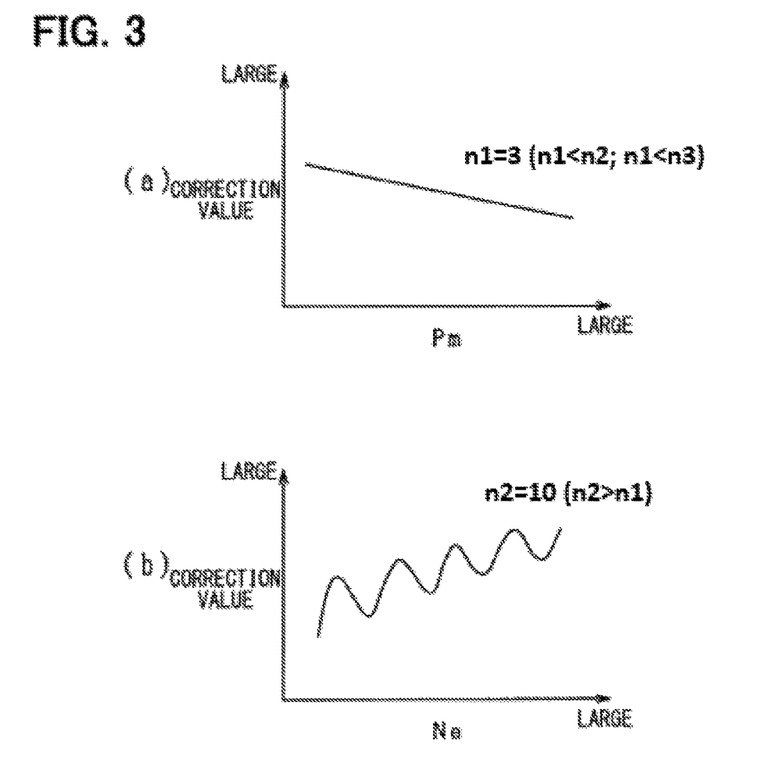
FIG. 3(a) is a view illustrating a relation between intake tube pressure and air amount correction value.
FIG. 3(b) is a view illustrating a relation between engine rotational speed and air amount correction value.

For example, the intake tube pressure Pm and an engine rotational speed Ne are considered. In the case where the deviation of the valve lift amount occurs, for the intake tube pressure Pm, the deviation direction of the amount of flowing air becomes uniform irrespective of magnitude of the Pm value. On the contrary, for the engine rotational speed Ne, the deviation direction of the amount of flowing air varies depending on magnitude of the Ne value. For this reason, using the intake tube pressure Pm as a parameter, the air amount correction value determined in the entire Pm region is as illustrated in FIG. 3(a). Using the engine rotational speed Ne as a parameter, the air amount correction value determined in the entire Ne region is as illustrated in FIG. 3(b).

That is, as illustrated in FIGS. 3(a) and 3(b), a relation between the intake tube pressure Pm and the air amount correction value is linear or substantially linear, while a relation between the engine rotational speed Ne and the air amount correction value is nonlinear. In the case of using Pm, the deviation direction of the amount of flowing air is uniform in the entire region, and in the case of using Ne, the deviation direction of the amount of flowing air is not uniform in the entire region. Thus, in the present embodiment, the number of learning points in Pm is different from the number of learning points in Ne. That is, the learning points in Pm is defined as n1, and the learning points in Ne is defined as n2 that is larger than n1. However, the relation: n1≥2 only needs to be satisfied. In the present embodiment, n1 is 3, and n2 is 10.

In the learning processing, the air amount correction value is calculated based on the comparison of the cylinder flowing air amount Gn calculated using the air intake valve model with an air intake amount Ga calculated from the detection result of the air flow meter 12. However, for example, in the intake passage, when air flows downstream of the air flow meter 12, the cylinder flowing air amount Gn cannot be directly compared with the air intake amount Ga. Thus, in the present embodiment, when it is determined whether the air intake amount Ga matches the actual amount of air flowing into the combustion chamber 22, and the air intake amount Ga is determined to match the actual amount, the air amount correction value is calculated based on the comparison of the cylinder flowing air amount Gn with the air intake amount Ga.

Figure 4:
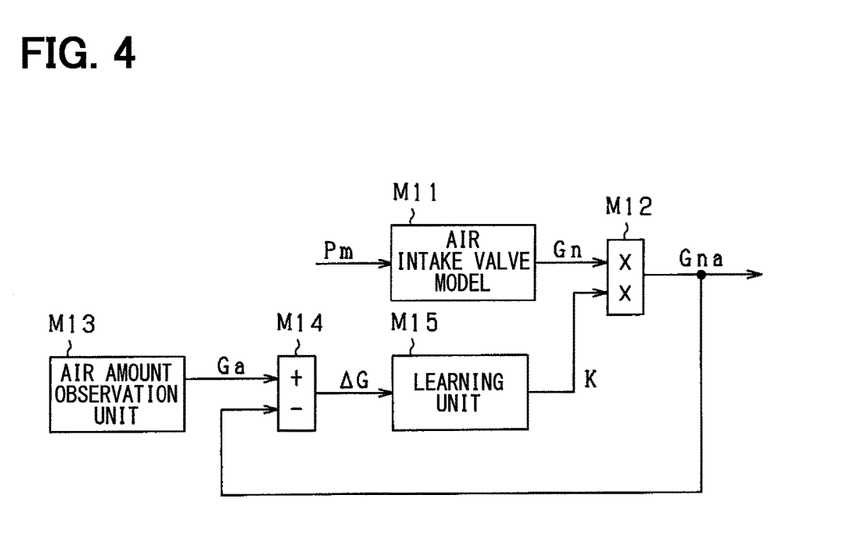
FIG. 4 is a block diagram illustrating summary of air amount calculation processing.

FIG. 4 is a block diagram illustrating summary of air amount calculation processing, and each function illustrated in FIG. 4 is achieved by an ECU 50.

An air flowing amount calculation unit M11 is configured of the air intake valve model, the cylinder flowing air amount Gn is calculated based on the intake tube pressure Pm. The intake tube pressure Pm may be a detection value detected by the intake tube pressure sensor 17, and may be an estimated value estimated using an intake manifold mode simulating a behavior of air flowing in the intake manifold 18. Intake temperature, engine rotational speed, and opening/closing timing of the air intake valve 31 may be used as parameters.

A correction unit M12 corrects the cylinder flowing air amount Gn calculated by the air flowing amount calculation unit M11, by using a learnt value K that is the air amount correction value, to calculate a corrected air amount Gna. The corrected air amount Gna is used to control the fuel injection amount and torque. The learnt value K has a default value 1, and is appropriately updated by learning processing.

An air amount observation unit M13 calculates the air intake amount Ga flowing in the intake pipe 11, based on a detection result of the air flow meter 12. The air intake amount Ga may be calculated as the amount of air for each cylinder, based on the engine rotational speed Ne or the like. A difference calculation unit M14 calculates an air amount difference ΔG that is a difference between the corrected air amount Gna calculated by the correction unit M12 and the air intake amount Ga calculated by the air amount observation unit M13.

A learning unit M15 calculates the learnt value K for each of a plurality of learning regions, based on the air amount difference ΔG, and stores the learnt value K in a predetermined backup memory (for example, nonvolatile memory such as EEPROM). Specifically, learning regions (x, y) having a plurality of Ne lattice points x and a plurality of Pm lattice points y are set, and at operation of the engine, the learnt value K is appropriately calculated or updated for each of the learning regions. In this case, for the engine rotational speed Ne, for example, 10 Ne lattice points x are set, and for the intake tube pressure Pm, for example, three Pm lattice points are set. For example the three Pm lattice points are a low load point, a middle load point, and a high load point.

Figure 5:
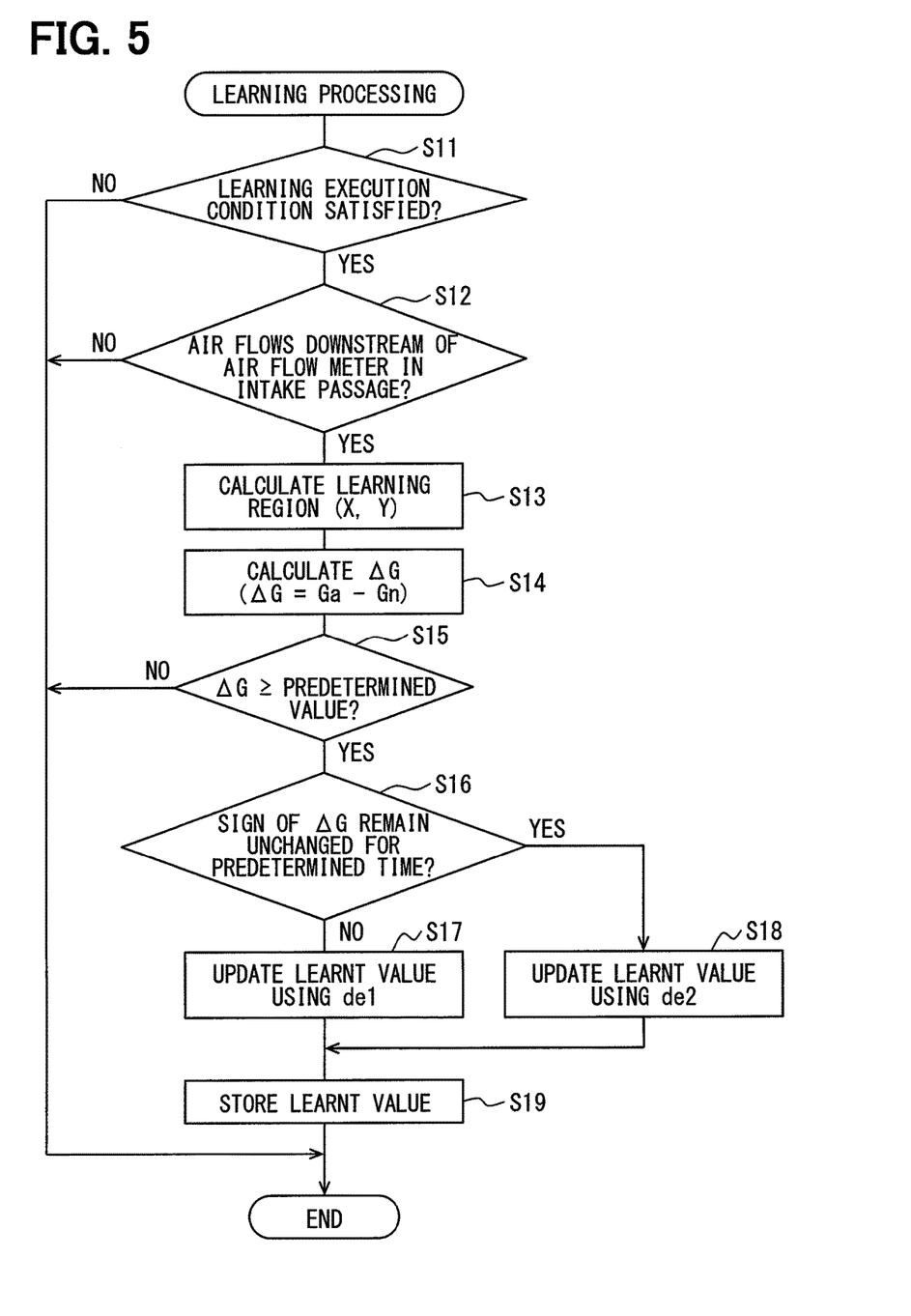
FIG. 5 is a flow chart illustrating learning processing.

FIG. 5 is a flow chart illustrating the learning processing, and the processing is repeated at predetermined cycles by the ECU 50.

In FIG. 5, in S11, the ECU 50 determines whether a learning execution condition is satisfied. In this case, the learning execution condition includes:

that a change in the engine rotational speed is a predetermined value or less; and that a change in the intake tube pressure is a predetermined value or less, and when both are satisfied, it is determined that the learning execution condition is satisfied. In the present embodiment, the change in the engine rotational speed and the change in the intake tube pressure each are a change within a predetermined time.

In S12, the ECU 50 determines whether air flows downstream of the air flow meter 12 in the intake passage. The determination corresponds to determination whether the air intake amount Ga calculated based on the detection result of the air flow meter 12 matches the actual amount of air flowing into the combustion chamber 22, more specifically, whether air intake amount Ga can be compared with the cylinder flowing air amount Gn calculated using the intake model. In this case, for example, when evaporated fuel is purged, in S12, No is selected. Alternatively, when EGR is performed, in S12, No is selected.

Then, when YES is selected in both of S11 and S12, the ECU 50 proceeds to S13, and when NO is selected in any of S11 and S12, the ECU 50 finishes the processing. In S13, the current learning region (x, y) is calculated from the engine rotational speed Ne and the intake tube pressure Pm. The learning region is determined by the above-described n1 Pm learning points and n2 Ne learning points.

In S14, the ECU 50 acquires the air intake amount Ga calculated based on the detection value of the air flow meter 12 and the cylinder flowing air amount Gn calculated using the intake model, and calculates the air amount difference ΔG using the Ga and Gn. In this case, the cylinder flowing air amount Gn may be the amount of air that reflects the calculated learnt value K, that is, the corrected air amount Gna. In the present embodiment, ΔG is found using a following equation:

$$\Delta G = Ga - Gn$$

In S15, the ECU 50 determines whether the air amount difference ΔG is a predetermined value or more, and when selecting YES, the ECU 50 proceeds to S16.

In S16 to S18, the ECU 50 performs update processing of the learnt value K [x, y] using predetermined learning update amounts de1, de2. In this case, update speed is changed according to magnitude of the air amount difference ΔG. When ΔG is relatively small, the smaller learning update amount de1 is used, and when ΔG is relatively large, the larger learning update amount de2 is used. In the present embodiment, de1 is smaller than de2.

Specifically, in the state where ΔG is the predetermined value or more (YES in S15), in S16, the ECU 50 determines whether a sign of the air amount difference ΔG remains unchanged for a predetermined time or more. In this case, when the air amount difference ΔG is relatively small, the sign of ΔG does not remain unchanged for the predetermined time, and NO is selected in S16. On the contrary, when the air amount difference ΔG is relatively large, the sign of ΔG remains unchanged for the predetermined time, and YES is selected in S16. When NO is selected in S16, the ECU 50 proceeds to S17, and updates the learnt value K [x, y] using the learning update amount de1. When YES is selected in S16, the ECU 50 proceeds to S18, and updates the learnt value K [x, y] using the learning update amount de1.

In S16 to S18, until ΔG reaches the predetermined value or more and the state is terminated, the ECU 50 updates the learnt value K [x, y].

Then, in S19, when ΔG converges and learning is completed, the ECU 50 stores the learnt value in a memory. At this time, when the calculation of the learnt value at each intake tube pressure Pm in the plurality of learning regions is completed, the ECU 50 may calculate a final learnt value as a median value from the learnt values at Pm learning points in the same Ne learning points, and may store the final learnt value in the memory. At this time, the ECU 50 may set a median learnt value among learnt values of three low load, middle load, and high load points to the final learnt value, or may calculate an average of the learnt values of the three points as a median value, and set the median value to the final learnt value.

The present embodiment described above in detail achieves following superior advantages.

In configuration in which the amount of air is learnt based on the comparison of the air intake amount Ga calculated based on the detection result of the air flow meter 12 with the cylinder flowing air amount Gn calculated using the air intake valve model, it is determined whether the air intake amount Ga matches the actual amount of air flowing into the combustion chamber 22. When the air intake amount Ga and the actual amount of air flowing into the combustion chamber 22 match each other, learning is made based on comparison of the air intake amount that is a detection value with the cylinder flowing air amount that is a model calculation value. For this reason, it prevents the matter that air flows downstream of the detection location of the air flow meter 12, degrading the learning accuracy. This can properly achieve learning on the air intake valve model to improve the calculation accuracy of the amount of air.

In the state where fuel purge from the canister 25 or EGR is performed, air flows downstream of the air flow meter in the intake passage. For this reason, a value calculated as the cylinder flowing air amount Gn does not match the air intake amount Ga calculated from the detection value of the air flow meter. In view of the point, in this embodiment, learning is not performed in the state where fuel purge from the canister 25 or EGR is performed, enabling proper learning processing.

When the cylinder flowing air amount deviates due to deviation of the valve lift amount, the deviation of the amount of air varies in characteristic (sensitivity) depending whether intake tube pressure Pm or the engine rotational speed Ne is used as a variable. In view of this point, the number of learning points in Pm is set to n1, and the number of learning points in Ne is set to the n2 that is larger than n1. Therefore, learning processing suitable for calculation of the amount of air can be executed while reducing the number of learning regions.

As described above, the deviation direction of the amount of flowing air is uniform in the entire region for the intake tube pressure Pm, and at the same Ne, learnt values at the Pm learning points are close to each other. In this case, one learnt value (for example, median value) is found from three learnt values, and the found learnt value is set to the final learnt value, such that the learnt value has a gain corresponding to only the engine rotational speed Ne. That is, the learnt value can be reflected only on Ne. Thereby, the learnt value can be readily reflected.

Other Embodiments

The above-mentioned embodiment may be modified as follows.

A plurality of learning regions may be determined using a VVT advance value that is the opening/closing timing of the air intake valve 31 as a parameter. That is, a plurality of learning regions are determined using the intake tube pressure Pm, the engine rotational speed Ne, and the VVT advance value, and a learnt value is calculated for each of the learning regions. In this case, given that the number of learning points of Pm is n1, the number of learning points of Ne is n2, and the number of learning points of VVT advance value is n3, the relation: n1<n2, n1<n3 is set.

In summary, for the VVT advance value that is the opening/closing timing of the air intake valve 31, like the engine rotational speed Ne, the deviation of the amount of air varies in characteristic (sensitivity) depending whether intake tube pressure Pm or the VVT advance value is used as a variable. Since the number of learning points in the case of including the VVT advance value as a parameter is set to n3, learning processing suitable for calculation of the amount of air can be executed. In this case, n3 is 10.

In the above-mentioned embodiment, as illustrated in FIG. 4, the difference calculation unit M14 calculates the air amount difference ΔG using the corrected air amount Gna calculated by the correction unit M12. However, the difference calculation unit M14 may calculate the air amount difference ΔG using the cylinder flowing air amount Gn calculated by the air flowing amount calculation unit M11. Then, as described above, the learning unit M15 calculates the learnt value K for each of the plurality of learning regions, based on the air amount difference ΔG.

A determination unit that determines whether the air intake amount Ga matches the actual amount of air flowing into the combustion chamber 22 may be configured as follows. A V-type engine having a plurality of banks (cylinder group) connected to respective branched intake passages includes a cylinder cut-off mechanism that has an air flow meter, which is provided at an intake collection unit located upstream the branch position of the intake passages, and switches the operation mode between full-cylinder operation of making all of the banks active, and cylinder cut-off operation of making one of the banks active and other banks inactive. When the cylinder cut-off mechanism is performing the cylinder cut-off operation, it is determined that the air intake amount Ga matches the actual amount of air flowing into the combustion chamber 22.

The learning unit may be configured to calculate a learnt value for correcting the characteristic value of the air intake valve model. Specifically, the learning unit learns a coefficient of model calculation. In this case, for the relation illustrated in FIG. 2, offset or gain of the characteristic line may be changed. The learning unit may be configured to calculate both of the learnt value for correcting the cylinder flowing air amount calculated using the model, and the learnt value for correcting the characteristic value of the air intake valve model. According to the present disclosure, the amount of air is referred to as the air amount.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A control system for an internal combustion engine including: a combustion chamber that combusts air flowing in an intake pipe with fuel; and an air intake valve provided at an intake port leading to the combustion chamber, the air intake valve being opened to allow air to enter into the combustion chamber, the control system comprising:
   a computer configured to execute instructions stored in a non-transitory computer-readable medium so that the control system is at least configured to perform:
      a air quantity calculation which calculates a cylinder flowing air amount that is an amount of air flowing into the combustion chamber, based on an intake tube pressure that is a pressure in the intake pipe, using an air intake valve model simulating a behavior of air flowing into the combustion chamber via the air intake valve;
      an air flowing amount calculation that calculates an air intake amount flowing in the intake pipe, based on a detection result of an air amount detection sensor provided at the intake pipe;
      a determination that determines whether the air intake amount calculated by the air flowing amount calculation matches an actual amount of air flowing into the combustion chamber; and
      a learning process that, when the air intake amount is determined to match the actual amount of air flowing into the combustion chamber, calculates a learnt value used to correct at least one of the cylinder flowing air amount or a characteristic value of the air intake valve model, based on comparison of the cylinder flowing air amount calculated using the air intake valve model with the air intake amount calculated by the air flowing amount calculation so as to calculate a corrected air amount, wherein
   the determination determines whether the air intake amount matches the actual amount of air flowing into the combustion chamber, based on at least one of that purge processing of discharging evaporated fuel absorbed on a canister into an intake passage has not been performed, or that an EGR unit has not introduced EGR gas into the intake passage,
   when the purge processing is performed and the EGR unit introduces the EGR gas into the intake passage, the determination does not perform the learning process for calculating a learnt value is not performed without respect to whether the air intake amount matches the actual amount, and
   the control system is further configured to perform control of a fuel injection amount and/or torque of the engine based on the corrected air amount.

2. The control system according to claim 1, wherein:
   the learning process calculates the learnt value for each of a plurality of learning regions using the intake tube pressure and an engine rotational speed as parameters; and
   a number n1 of learnt values of the intake tube pressure and a number n2 of learnt values of the engine rotational speed in the plurality of learning regions are set such that n1 is smaller than n2.

3. The control system according to claim 2, wherein the learning process calculates a final learnt value that is a median value, from the learnt values at each intake tube pressure at the same engine rotational speed, after calculating the learnt value at each intake tube pressure in the plurality of learning regions.

4. The control system according to claim 2, wherein:
   the plurality of learning regions is determined to include an opening/closing timing of the air intake valve as a parameter; and
   a number n3 of learnt values of the opening/closing timings determined in the plurality of learning regions is larger than the number n1 of learnt values of the intake tube pressure.

* * * * *